UNITED STATES PATENT OFFICE.

EDWARD R. HODGKINS, OF BALTIMORE, MARYLAND, ASSIGNOR OF TWO-THIRDS TO JOHN E. SUDLER, OF SAME PLACE.

PROCESS OF MAKING PHOSPHATIC FERTILIZERS.

SPECIFICATION forming part of Letters Patent No. 423,320, dated March 11, 1890.

Application filed November 12, 1889. Serial No. 330,098. (No specimens.)

*To all whom it may concern:*

Be it known that I, EDWARD R. HODGKINS, of the city of Baltimore, in the State of Maryland, have invented certain new and useful Improvements in the Process of Making Fertilizers, whereof the following is a full and exact description.

My invention rests upon the discovery that the tricalcic phosphatic rock or fossiliferous bone phosphate of South Carolina and other localities, when finely comminuted and intimately admixed with finely-comminuted calcic oxide, is immediately available as a plant food or fertilizer, and to as great a degree as if the phosphoric acid present in the rock had been rendered soluble by the usual expensive preliminary treatment with sulphuric acid.

In carrying out my invention I reduce the phosphatic rock by grinding to as fine a state of comminution as possible, and then add to it anhydrous calcic oxide, (for instance, in the form of burnt oyster-shells.) I have found it convenient in this connection to first spread out upon a suitable platform or in a suitable receptacle a layer of anhydrous calcic oxide to the depth of about an inch. I then spread upon this layer a layer of ground phosphatic rock equal in weight to the lime. This procedure of building up alternate layers of unslaked lime and ground phosphatic rock I continue until a sufficient quantity is present for a single manipulation. I then slake the lime by sprinkling over the mass a sufficient quantity of water. The lime, which need not be finely ground when placed in the layers, thereupon becomes at once friable, and by agitating or stirring the mass the slaked lime breaks up into a finely-comminuted condition and an intimate admixture with the finely-comminuted phosphatic rock is attained.

The period most favorable for making this mixture as intimate as possible is when the lime is first slaked and at the slaking heat, at which time it can be more finely subdivided by the mixing operation.

The mixture thus produced constitutes the product of my invention, and is in immediate condition for effective use as a fertilizer. The calcic oxide on coming into contact with the organic matter always present in arable soil converts it into humic and ulmic acids, which act as powerful solvents of mineral matter, besides having great affinity for the carbonic acid produced during the conversion of the organic matter and brought down by rains. The acids also act as a solvent for the tricalcic phosphate, rendering it in proper condition for assimilation by plants.

Having thus described my invention, what I claim is—

1. The process of making fertilizers, which consists in arranging finely-pulverized phosphatic material and calcic oxide in alternate layers, slaking the calcic oxide by the addition of water, and finally intimately mixing the ingredients, substantially as described.

2. The process of making fertilizers, which consists in combining finely-pulverized phosphatic material and calcic oxide, slaking the calcic oxide by the addition of water, and finally intimately mixing the ingredients, substantially as described.

EDWARD R. HODGKINS.

Witnesses:
JOHN LAING,
H. D. HODGKINS.